United States Patent Office 3,151,460
Patented Oct. 6, 1964

3,151,460
FLUID PRESSURE ACCESSORY SYSTEM
Martin Bitzer, Kenmore, and Raymond A. Deibel, Cheektowaga, N.Y., assignors to Trico Products Corporation, Buffalo, N.Y.
Filed Sept. 10, 1962, Ser. No. 222,528
6 Claims. (Cl. 60—60)

The present invention relates to a fluid pressure accessory system and, more particularly, to an accessory system utilizing a vacuum operated motor augmented by a pump supplying super atmospheric pressure.

Automobile accessories such as automatic fluid pressure actuated windshield wipers have been provided which are operable directly by suction produced by the engine of a motor vehicle as by connecting the intake manifold or a suction passage located between the engine and the fuel supply with the accessory motor. Such a system and its advantages are well known as, for example, its ability to give years of trouble free service without maintenance and its characteristic of utilizing by-product power from the vehicle to produce motion without adding any appreciable load to existing power sources in the vehicle. However, the speed of this type of motor varies with the amount of vacuum produced in the engine intake manifold which unavoidably fluctuates with variations in operational conditions of the engine.

Various means have been employed to augment the vacuum pressure when intake manifold vacuum is low such as during periods of rapid acceleration. These means include auxiliary vacuum pumps, vacuum storage tanks, compressed air storage tanks and auxiliary engine operated pumps, both pressure and vacuum. These prior art means for assisting the vacuum produced by the intake manifold involve complex control means for regulating the auxiliary pressure and for discontinuing operation of the auxiliary pressure supply when it is not needed.

It is essential, in utilizing either assisting super atmospheric pressure or sub atmospheric pressure, to provide means for discontinuing the assist during periods of high manifold vacuum in order to maintain a constant optimum accessory motor speed and to avoid excessive noise and undue wear on the accessory system. It is also essential that the assisting pressure supply be halted when the accessory is not operating.

Therefore, the principal object of the present invention is to provide a simple, economical fluid system for actuating vehicle accessory motors which utilizes existing equipment without the need for additional control equipment.

Another object of the present invention is to provide an improved fluid actuated accessory system for motor vehicles which augments vacuum operated motors by supplying super atmospheric pressure resulting in a push-pull operated accessory motor.

A further object of the invention is to provide an improved fluid actuated system for operating accessory motors in which the pressure differential utilized for operating motors is maintained constant by use of a fluctuating source of sub atmospheric pressure and an inherently adjustable source of super atmospheric pressure which is discontinued during periods of high vacuum.

A still further and more specific object of the invention is to provide an improved fluid system for actuating accessory motors which utilizes vacuum obtained from the intake manifold alternately on one side or the other of an accessory motor piston and, at the same time, connects the remaining side of the piston to the atmosphere through a part-time double acting pump capable of supplying a pressure assist when required.

Other objects and advantages of the invention will be apparent from the following detailed description taken in connection with the accompanying drawings in which:

FIG. 2A is a view similar to FIG. 2 showing the position of the valve when the piston is moving upwardly;

The invention is illustrated and described, by way of example, for operating a windshield wiper.

Briefly, the system includes a windshield wiper of a fluid actuated type in which the motor has a chamber dividing it into first and second compartments by a piston which is adapted to be moved alternately in opposite directions. The chamber is connected to the intake manifold of a vehicle engine through a conduit and is also connected to the atmosphere through a double acting part-time pump. A reversing valve is provided for directing the vacuum first to one side of the piston and then to the other while directing the air passing from the atmosphere through the pump to the compartment on the opposite side of the piston from the compartment which is in communication with the vacuum source.

The pump includes a housing having a piston reciprocable therein. Unidirectional inlet and outlet ports are provided on each side of the piston. The inlet ports intercommunicate with each other and the outlet ports intercommunicate with each other. The inlet ports are connected through a conduit and the engine air filter to the atmosphere. The outlet ports are connected to the control housing of the windshield wiper motor. The pump is operated in one direction by linkage in free engagement with the cam shaft and is returned by a return compression spring.

Figure 1:
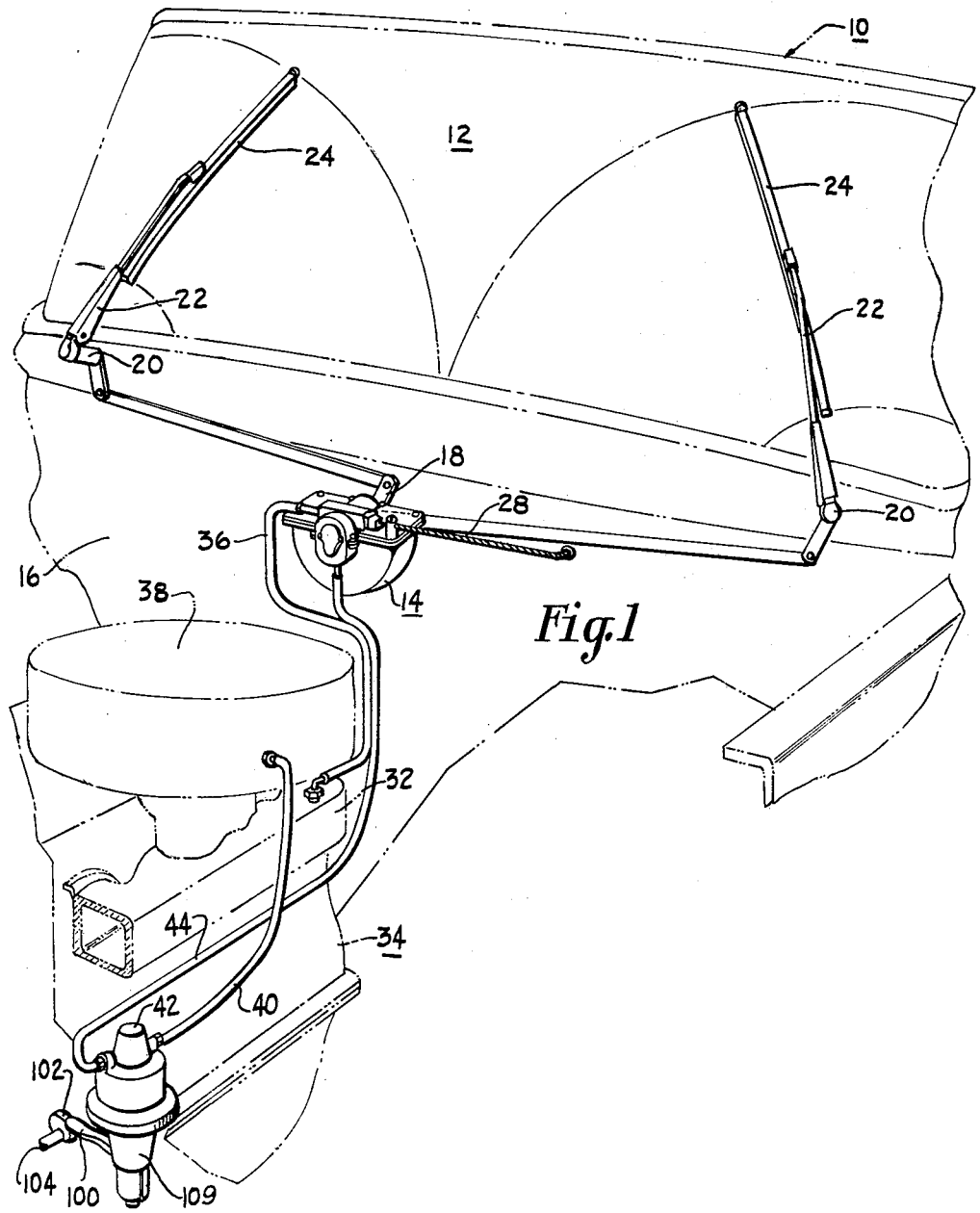
FIG. 1 is a fragmentary perspective view of an automotive vehicle incorporating the improved fluid system.

In FIG. 1 a portion of an automotive vehicle 10 is shown having a windshield 12 mounted thereon. Windshield wiper motor 14, which may be suitably mounted on the fire wall 16 of the vehicle, is adapted to cause oscillation of crankarm 18 coupled thereto which is linked to rockshafts 20 journaled in the cowl of the vehicle, the rockshafts mounting wiper arms 22 in which are mounted wiper blades 24 in any conventional manner. It will readily be appreciated that when motor 14 is placed in operation, as described in detail hereinafter, it will cause oscillation of wiper blades 24 across windshield 12.

In order to place the windshield wipers in operation, a manual control, not shown, is mounted on the vehicle dashboard, not shown. The manipulation of this control will cause core 26 of Bowden wire unit 28 to move the spool valve 30, FIG. 3, to permit vacuum to communicate with motor 14 from intake manifold 32 of engine 34 through conduit 36. It will also permit air from air filter 38 through conduit 40, pump 42 and conduit 44 to communicate with motor 14.

Figure 3:
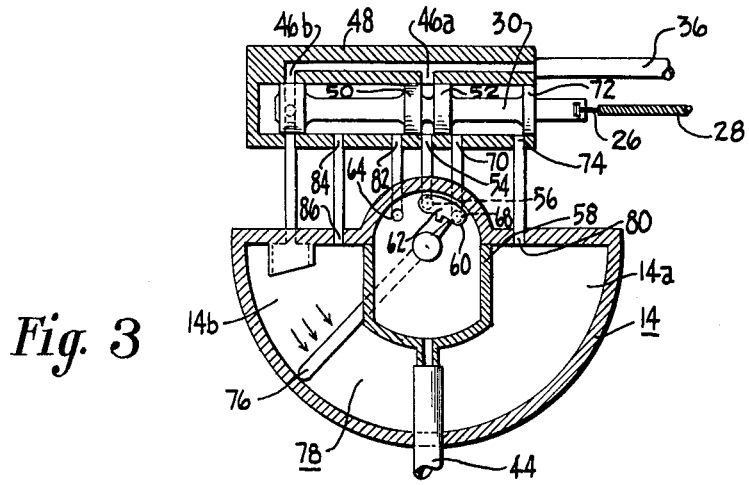
FIG. 3 is a cross sectional view of a windshield wiper in a running position utilized in connection with this invention.
Figure 4:
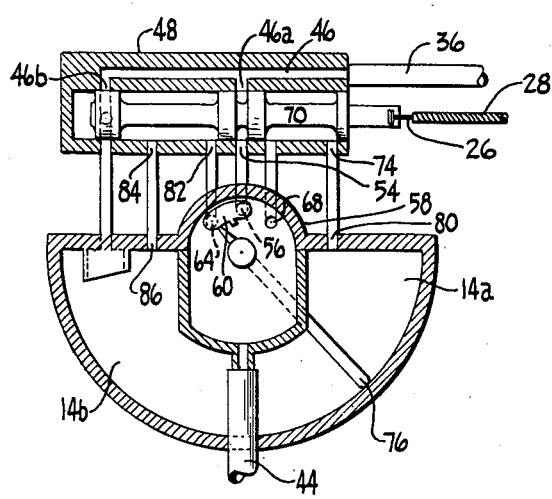
FIG. 4 is a view similar to FIG. 3 showing the windshield wiper operated in a reverse direction.

When the valve 30 has been moved to the right to the position shown in FIGS. 3 and 4, vacuum will be admitted through conduit 36, passage 46 in valve housing 48, port 46a to valve housing 48 between lands 50 and 52 of spool valve 30 and will communicate with port 54 in the valve housing 48 and port 56 in the control housing 58 of motor 14. A slide valve 60 having an elongated recess 62 is located within control housing 58 which contains ports 64, 56 and 68. The recess 62 may connect ports 56 and 68, as shown in FIG. 3, or ports 56 and 64, as shown in FIG. 4. When the valve 60 is in the position shown in FIG. 3, port 56 communicates through port 68 with a port 70 intermediate lands 52 and 72 of valve 30. Vacuum is thus admitted to compartment 14a through port 74. Compartment 14a is the compartment to the right formed by the piston or paddle 76 which divides the wiper motor chamber 78 into compartments 14a and 14b. The valve 60 is operatively connected with the paddle or piston 76 to move in response to movement of the piston. The port 74 of valve housing 48 communicates with port 80 to admit vacuum to compartment 14a.

Simultaneously with the admission of vacuum to compartment 14a, air either at atmospheric pressure or super atmospheric pressure will be admitted to control housing 58 through conduit 44. From control housing 58 the air flows through port 64 through ports 82 and 84 in valve housing 48, and port 86 to compartment 14b. The pressure difference across piston 76 between compartment 14b and compartment 14a will cause the piston 76 to move in the direction of the arrows, as seen in FIG. 3, until this movement causes the slide valve 60 to be moved to the position shown in FIG. 4, at which time the recess 62 will connect ports 56 and 64 causing reversal of the air flow in the wiper motor.

Reversal of air and vacuum paths effects reversal of the piston as follows: Vacuum will be admitted through conduit 36, passage 46, port 46a, through ports 54, 56 and 64, through port 82 in valve housing 48 and ports 84 and 86 to compartment 14b. Simultaneously, air at atmospheric pressure or above will flow through conduit 44 to control housing 58, through ports 68 and 70, valve housing 48, ports 74 and 80 to compartment 14a. This will cause piston 76 to move in the direction of the arrows, as seen in FIG. 4.

Figure 5:
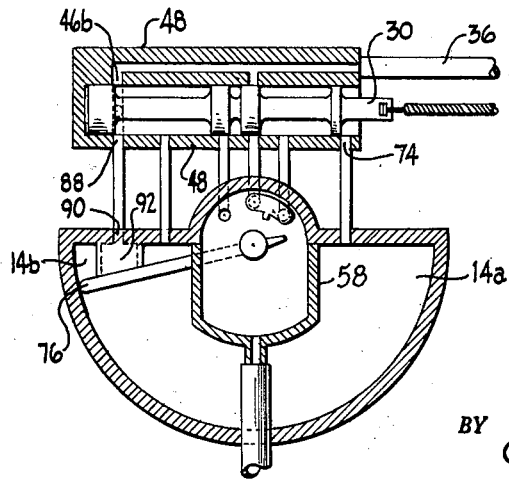
FIG. 5 is a view similar to FIG. 4 showing the windshield wiper motor in a parked position.

Thus the wiper will be moved alternately in opposite directions until the valve 30 is moved to the left to the position shown in FIG. 5, at which time the piston 76 will move to a parked position shown in FIG. 5. When the valve 30 is moved to this position, port 74 vents chamber 14a to the atmosphere. Branch port 46a is closed by land 52 of valve 30. Port 46b is opened to communicate with port 88 which, in turn, communicates with port 90 in compartment 14b of the wiper motor 14. Ports 62, 56 and 60 are closed. Vacuum is admitted through conduit 36 into valve housing 48 through port 46b and out of housing 48 through port 80. It enters compartment 14b through port 90. Air at atmospheric pressure enters port 74 and communicates with port 80 to compartment 14b. Thus a pressure differential exists between compartment 14a and compartment 14b driving the piston 76 to the position against stop 92, as seen in FIG. 5, where it remains until the spool valve 30 is again actuated.

The above describes a conventional type of windshield wiper motor and is shown by way of example. It will, of course, be understood that in the broader aspects of the invention, any suitable type of fluid actuated motor having reversing valve means may be employed. In order to provide pressure substantially above one atmosphere, pump 42 is connected between conduits 40 and 44. Pump 42 may be formed as part of a conventional fuel pump in which a second chamber is provided. Pump 42 may be actuated simultaneously with the fuel pump by a lever 100 which engages an eccentric 102 on engine cam shaft 104, as shown in FIG. 1. The pump 42 comprises a part-time double acting fluid pressure pump which is provided with a casing 106 adapted for mounting adjacent a convenient portion of the internal combustion engine 34 as, for example, as part of the fuel pump 109. The casing 106 is formed with a chamber 108 for the reception of a fluid displacing member such as the piston 110. The piston 110 divides the casing 106 into an upper compartment 108a, and a lower compartment 108b. The upper compartment 108a is provided with an outlet port 112 and an inlet port 114. The compartment 108b is provided with an outlet port 116 and an inlet port 118. Passages 120 and 122 are provided in the wall of the casing 106 to permit intercommunication of outlet ports 112 and 116 and inlet ports 114 and 118, respectively. The ports 112, 114, 116 and 118 are controlled by valving members 124, 126, 128 and 130, respectively, to permit unidirectional flow of fluid. Valves 124 and 128 permit fluid flow out of the compartments 108a and 108b, respectively, and the valving members 126 and 130 permit unidirectional flow of fluid into the compartments 108a and 108b, respectively. When the piston is moving downwardly, the valves 124, 126, 128 and 130 assume the position shown in FIG. 2. In this position, valve 124 is seated and prevents air flow into or out of the chamber. Valve 126 is in its open position, permitting flow of air into compartment 108 of chamber 108. Air flow through conduit 122 causes the valve 130 to seat in a position where fluid flow into and out of chamber 108 is precluded. Valve 128 is unseated and the air compressed in compartment 108b by the downward movement of the piston passes through conduit 120 to conduit 44 and thence to the wiper motor control valve housing 58. The compressed air in conduit 120 on the downward stroke of piston 110 effects the seating of valve 124. When the piston 110 is moving upwardly the valves assume the position shown in FIG. 2A. Valve 130 is unseated, valve 128 is seated, valve 126 is seated and valve 124 is unseated. As the piston 110 moves upwarldy, air is drawn through conduit 40 and conduit 122 to effect unseating of valve 130 to permit passage of air through conduit 118. Compression of the air in compartment 108a of chamber 108 as the piston 110 moves upwardly causes the seating of valve 126 and the unseating of valve 124. Thus, the compressed air passes through conduit 112 to conduit 44 and thence to the motor control valve housing 58. The compressed air also passes through conduit 112 and conduit 120 to effect seating of valve 128.

Figure 2:
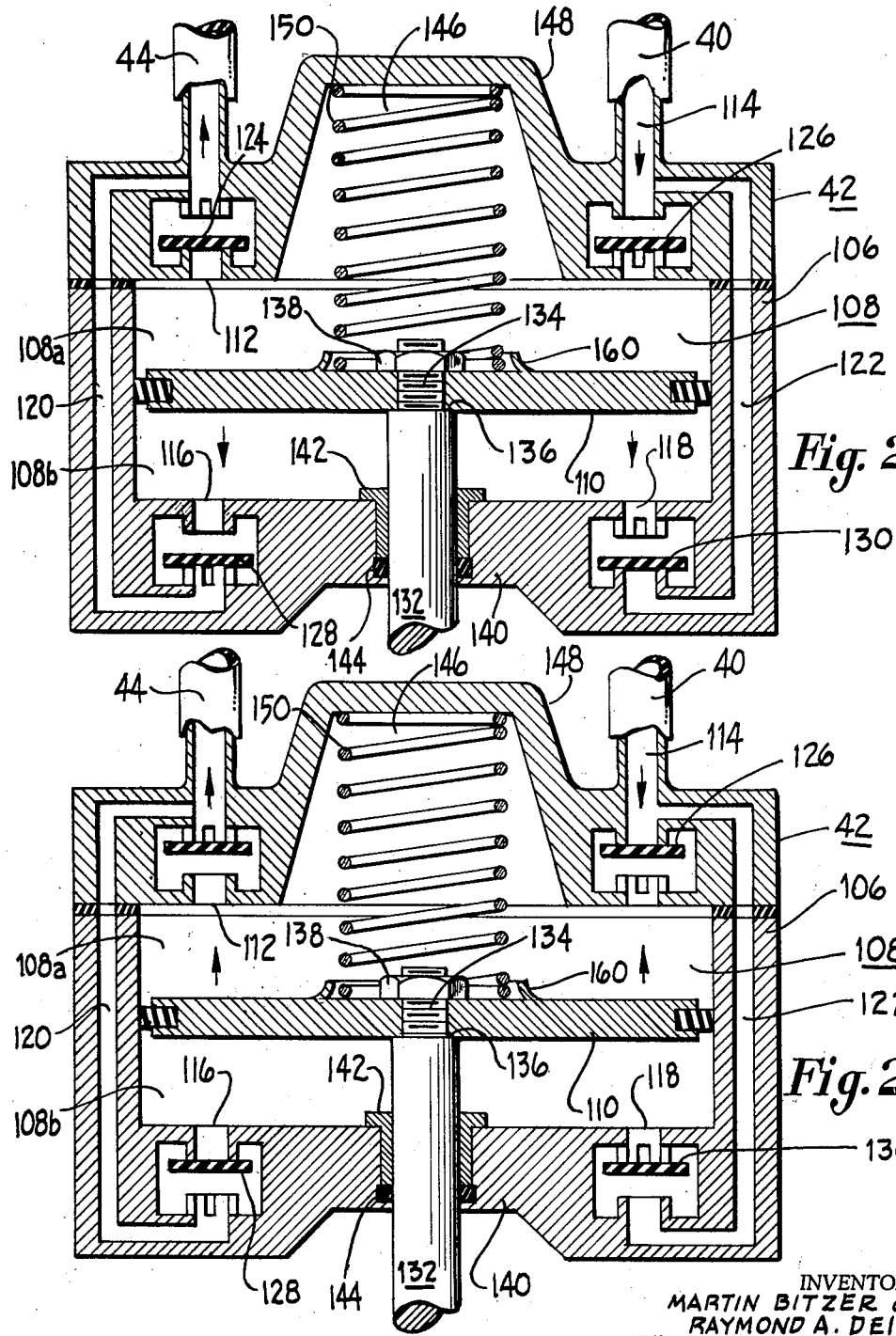
FIG. 2 is a view in cross section of the pump utilized in this invention showing the position of the various valving when the piston is moving downwardly.

A push rod 132 is connected centrally to the piston 110 by any suitable means as, for example, a reduced threaded end portion 134 formed in a shoulder 136 and a nut 138, as shown. The push rod 132 extends through the lower wall 140 of the casing 106 through a bearing 142 and a sealing ring 144. The push rod 132 is operatively connected in a manner not shown to arm 100. A well 146 is provided centrally in the upper wall 148 of the casing 106 for receiving a compression spring 150. The compression spring 150 bears at one end against the end surface of the well 146 and at its other end it is received in a central retainer 160 on the piston 110. It can, therefore, be seen that the piston is driven upwardly, as seen in FIG. 2, by the eccentric 102 on the cam shaft 104 through the arm 100 and push rod 132 and is returned to its downward position by the compression spring 150. The inlet ports 114 and 118 are connected through conduits 40 to air filter 38 drawing air at atmospheric pressure. The air is expelled through ports 112 and 116 to conduit 44 which communicates with the control housing 58 of the motor 14. Thus the motor 14 communicates with the atmosphere through the pump 42.

When sufficient vacuum is supplied to the wiper motor to permit operation at the desired speed, the volume of air drawn by the wiper motor exceeds the volume which can be supplied by the pump at pressures exceeding air at atmospheric pressure. Thus the valves 124, 126, 128 and 130 are opened by air at atmospheric pressure, which air merely passes through the pump to vent the wiper motor. For example, when sufficient vacuum is being supplied from the intake manifold 32 to the motor 14, motor 14 operates at a desired running speed. If the piston 76 is moving to the right, as seen in FIG. 4, the volume of the compartment 14a expands so rapidly as to cause a reduced pressure in compartment 14a below atmospheric pressure. The volume of air transferred by the pump to the compartment 14a under these conditions is insufficient to maintain pressure in compartment 14a at atmospheric pressure or above. Thus, there is a reduction in pressure in conduit 44 communicated from a reduced pressure in compartment 14a through conduit 80, conduit 74 and port 68, control housing 58 to conduit 44. Since the pressure in conduit 44 is lower than the pressure in the pump chamber 108, valve 124 is raised from its seat and valve 128 is also held open. The reduced pressure is communicated through compartment 108a to valve 126 causing the opening of valve 126. Likewise, the reduced pressure is communicated through the compartment 108a to the valve 130 causing the valve 130 to open. When the pump is in this condition, air can circulate freely from conduit 40 which is in communication with an atmospheric vent to an air filter 38 and through the pump chamber 108 to conduit 44. Thus, the compartment 14a of motor 14 is merely vented through conduit 44, the pump 42 and conduit 40 and the air filter 38. When the vacuum falls below a value sufficient for desired wiper speed, air under pressure exceeding atmospheric pressure is supplied by the pump because under these conditions the volume of air flowing to the wiper motor is such that the pump can be effective as a compressor.

The very unique results obtained by this system should now be apparent. When the intake manifold vacuum is low under such conditions as rapid acceleration or when the vehicle is proceeding up a hill, the pump is most effective. Under these conditions engine speed is high thus causing the piston 110 to move very rapidly rendering it capable of compressing large volumes of air. When the engine is idling, the manifold vacuum is at its maximum, the piston is operating at minimum speed and becomes incapable of compressing sufficient volume of air to supply the wiper motor pressurized fluid above one atmosphere. Therefore, a push-pull action at the wiper motor is provided when it is required and is automatically discontinued or reduced when it is not required.

When a wiper motor or other fluid-motor-operated accessory is not in use, as is frequently the case with motor vehicle accessories, it is desirable to discontinue operation of the pump to prevent undue wear to the system and to the pump, as well as to prevent noises which accompany operation of a pressure pump. This halting of the operation of the pump when the accessory is not in operation is inherent in the system. For example, when the wiper motor is not in operation, the ports in the control housing 58 are all effectively closed as shown in FIG. 5. Thus, although the engine will operate the piston 110 to move upwardly, the build-up of pressure in the pump chamber 108 will be such as to render the spring 150 incapable of returning the piston 110 to its downward position, thereby effectively halting operation of the pump.

It should now be apparent that an improved and effective fluid system utilizing a novel and unique double acting part-time pressure pump has been provided for supplying super atmospheric pressure to augment vacuum pressure and increase the pressure differential on a fluid operated motor piston only when required. The unique construction and design of the system provdies inherent reduction of the super atmospheric pressure when it is not required and inherent discontinuing of the pump operation when the accessory motor is not in operation. This is accomplished with a simple but effective fluid system which utilizes standard equipment normally found on motor vehicles.

A certain specific embodiment of the invention has been described for purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A fluid actuated windshield wiper system comprising a push-pull wiper motor having a chamber, a piston dividing said chamber into first and second compartments and adapted to be moved alternately in opposite directions, a source of fluctuating sub atmospheric pressure, a pump constituting a part-time source of super atmospheric pressure, valve means connecting one of said first and second compartments, alternately, to said source of fluctuating sub atmospheric pressure, means operable simultaneously with said valve means for connecting the other of said first and second compartments, alternately, to the atmosphere through said pump, means responsive to the velocity of said wiper motor piston for varying the outlet pressure of said pump and variable speed power means for driving said pump.

2. A fluid actuated windshield wiper system comprising a push-pull wiper motor having a chamber, a piston dividing said chamber into first and second compartments and adapted to be moved alternately in opposite directions, an automobile engine intake manifold constituting a source of fluctuating sub atmospheric pressure, a pump constituting a part-time source of super atmospheric pressure, valve means connecting one of said first and second compartments, alternately, to said intake manifold, means operable simultaneously with said valve means for connecting the other of said first and second compartments, alternately, to the atmosphere through said pump, means responsive to the velocity of said piston for varying the outlet pressure of said pump and power take-off means connected to the engine for driving said pump.

3. A fluid actuated windshield wiper system comprising a push-pull wiper motor having a chamber, a piston dividing said chamber into first and second compartments and adapted to be moved alternately in opposite directions, a source of fluctuating sub atmospheric pressure, a boosting pump constituting a part-time source of super atmospheric pressure; valve means connecting one said first and second compartments, alternately, to said source of fluctuating sub atmospheric pressure, means operable simultaneously with said valve means for connecting the other of said first and second compartments, alternately, to the atmosphere through said pump, means responsive to the velocity of said piston for varying the outlet pressure of said pump and power take-off means connected to an automobile engine for driving said pump.

4. A fluid actuated windshield wiper system comprising a push-pull wiper motor having a chamber, a piston dividing said chamber into first and second compartments and adapted to be moved alternately in opposite directions, a source of fluctuating sub atmospheric pressure, means connecting one of said first and second compartments, alternately, to said source of fluctuating sub atmospheric pressure, a part-time boosting pump constituting a source of super atmospheric pressure comprising a chambered casing, a piston movable in the casing, unidirectional inlet means in the casing on one side of the piston for admitting air at atmospheric pressure to said casing, unidirectional outlet means in the casing on said one side of the piston for communicating with the other of said first and second compartments, alternately, and variable speed power means for driving said pump.

5. A fluid actuated accessory system for motor vehicles comprising a push-pull fluid operated motor for driving an accessory, said motor having a chamber, a piston dividing said chamber into first and second compartments and adapted to be moved alternately in opposite directions, a source of fluctuating sub atmospheric pressure, means connecting one of said first and second compartments, alternately, to said source of fluctuating sub-atmospheric pressure, a part-time, double acting, boosting pump constituting a source of super atmospheric pressure comprising a chambered casing, a piston movable in the casing, unidirectional inlet means in the casing on each side of the piston for admitting air at atmospheric pressure to said casing, said inlet means intercommunicating, unidirectional outlet means in the casing on each side of the piston for communicating with the other of said first and second compartments, said outlet means intercommunicating, variable speed power means for driving said piston in one direction and resilient means for driving said piston in the other direction.

6. A fluid actuated accessory system for motor vehicles having an engine comprising a push-pull fluid operated motor for driving an accessory, said motor having a chamber, a piston dividing said chamber into first and second compartments and adapted to be moved alternately in opposite directions, means for supplying one of said first and second compartments, alternately, sub atmospheric pressure, which pressure varies with changes in rate of acceleration of said engine and means for supplying fluid to the other of said compartments at pressures which vary directly with engine speed and with the increase in pressure of said sub atmospheric pressure.

References Cited in the file of this patent

UNITED STATES PATENTS

| | | |
|---|---|---|
| 1,694,279 | Oishei | Dec. 4, 1928 |
| 2,095,833 | Rockwell | Oct. 12, 1937 |
| 2,538,327 | Rappl | Jan. 16, 1951 |
| 2,564,173 | Rappl et al. | Aug. 14, 1951 |
| 2,622,399 | Babitch | Dec. 23, 1952 |
| 3,023,445 | Oishei et al. | Mar. 6, 1962 |